Jan. 19, 1965  A. W. MACTAVISH  3,166,130
ROCK PICKER
Filed Feb. 27, 1963  2 Sheets-Sheet 1

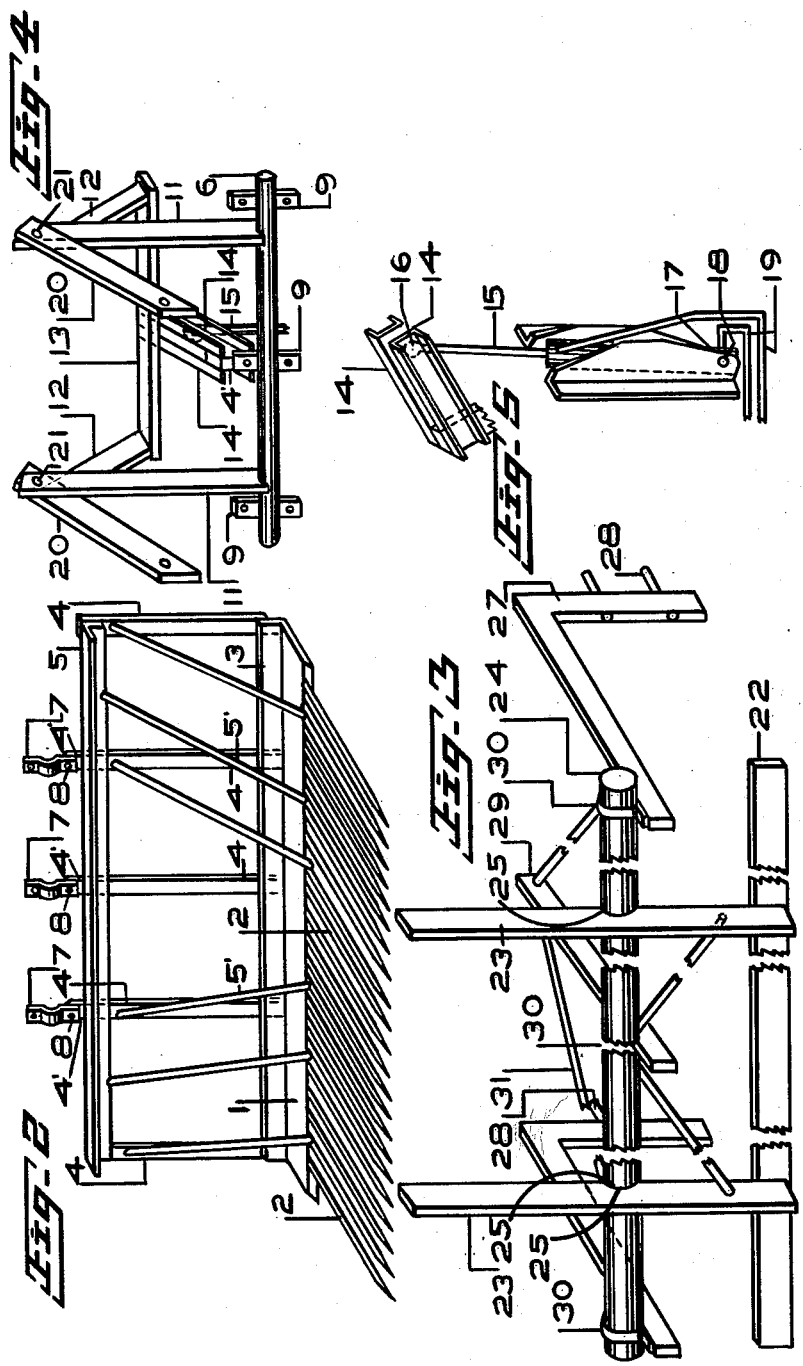

United States Patent Office 3,166,130
Patented Jan. 19, 1965

3,166,130
ROCK PICKER
Angus William Mactavish, Acadia Valley,
Alberta, Canada
Filed Feb. 27, 1963, Ser. No. 261,364
1 Claim. (Cl. 171—63)

This invention relates to rock picking attachments to be carried on the front end of a tractor and by which rocks may be gathered from the ground and dumped in piles or loaded in a carrier.

In the art to which the invention relates various machines have been proposed for picking rocks from the ground. These more usually provide teeth for dislodging the rocks and an apron with reel or the like by which the dislodged rocks may be moved rearward to a hopper or following carrier. Such machines are expensive to build and operate, and are consequently not suited to small holdings.

The present invention contemplates improvements in rock picking apparatus by provision of a gathering fork to be carried on the front of a tractor in rock gathering relation to the ground, and in association with the fork a blade movable forward and backward across the upper face of the fork by which the rocks may be moved to the back of the fork as they are dislodged from the ground and picked up by the teeth and to aid in the dislodgment of the rocks.

In the drawings, wherein is disclosed a preferred embodiment of the invention,

FIG. 2 is a front perspective view of the fork taken by itself.

FIG. 3 shows an enlarged front perspective, broken away in part, of the push bar and the mounting for the push bar.

FIG. 4 shows a perspective of the operating mechanism for the push bar taken by itself, shown with the hydraulic cylinder omitted and the cylinder rod broken away.

FIG. 5 is a side view of the hydraulic cylinder and its mounting, shown in part broken away.

Figure 1:
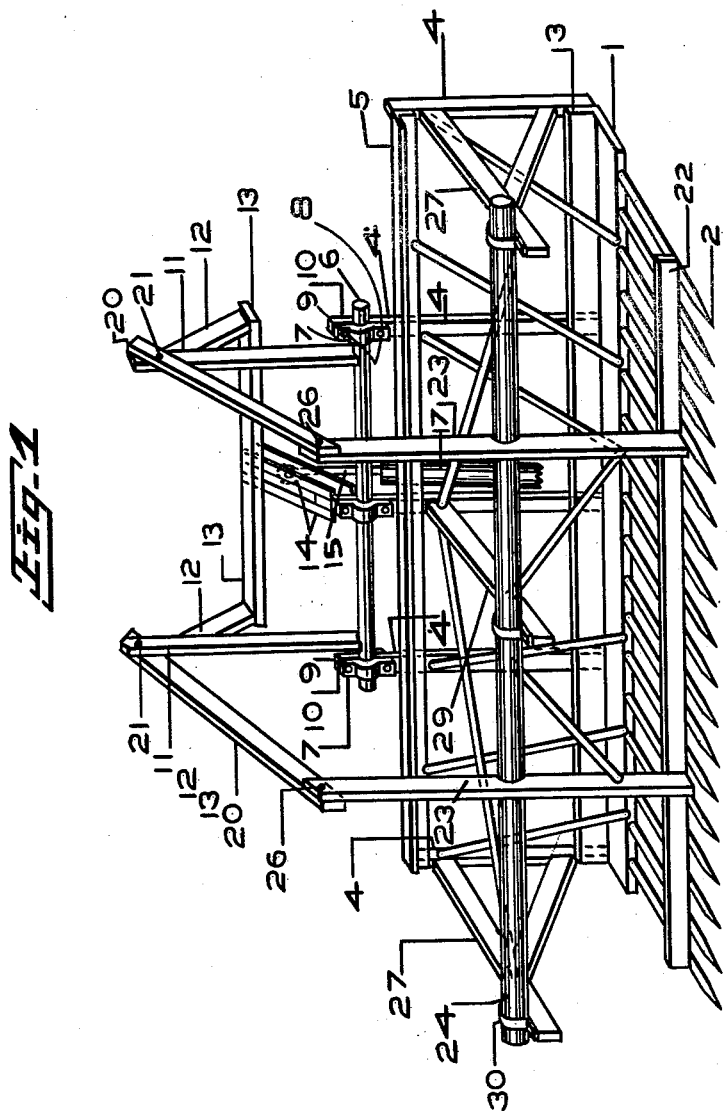
FIG. 1 is a front perspective of the attachment assembled and with the push bar for the rocks forwardly on the fork, and shown broken away in part and omitting the base mounting for the hydraulic cylinder.

Having reference to the drawings, the rock picker as herein shown is made up of three sections that are separately illustrated in FIGURES 2, 3 and 4, and are shown assembled in FIGURE 1. The assembled sections are to be mounted on the forward end of a tractor, fixed thereto or carried by push bars such as is common in tractor bull dozing attachments and by which the rock picking attachment may be elevated for dumping.

The rock gathering fork section, FIG. 2, comprises a base plate 1 in which are mounted a series of pointed teeth 2 at uniform intervals. The base plate includes an upstanding integral back 3 on which are fixed uprights 4 with angle iron top horizontal bar 5 and braces 5' between the forward side of the base plate and the uprights and horizontal bar.

In gathering rocks by the fork it is desirable to be able to push the rocks back on the fork and to aid in dislodging the rocks from the ground. For this a blade 22 is used attached on the lower end portions of blade push arms 23 that are intermediately secured, as by welding, to a tubular shaft 24, for which the arms are cut away in part at 25 to form recesses for engaging the shaft. These blade engaging push arms are pivotally attached to the forward ends of the tie bars 20 by pins 26.

For mounting the shaft 24 two angle arm brackets 27 are secured by bolts 28 to the end two of the uprights 4. The shaft 24 is mounted to turn on these arms and a center reinforcing arm 29 by bearing brackets 30, and the angle brackets are tied to this center arm by braces 31.

Further mounted on the fork section is a blade actuating section, shown separately in FIGURE 4. This consists of a shaft 6 mounted to turn axially in bearing plates 7 attaching by bolts 8 to mating bearing plates 9 and to the upper end portions of the center three of the uprights 4 that project upwardly of the bar 5, as at 4', the shaft riding on the upper ends of the uprights, and for this are included filler blocks 10 between the upper ends of the pair of bearing plates on each upright, as shown in FIGURE 1.

Fixed, as by welding, to the shaft 6 are upstanding arms 11, and these arms carry fixed thereto, as by welding, depending arms 12 to which is secured a cross bar 13. To the under side of the cross bar and the upper end portion of the center one of the uprights 4 is attached, as by welding, a push bar formed of two lengths of channel iron 14—14, between which is pivoted a connecting rod 15 on a pin 16, the connecting rod forming part of a hydraulic lift including a cylinder 17 for raising and lowering the bar 13 with the shaft 6 turning in its bearings formed by the plates 7 and 9, the cylinder 17 having a pivotal mounting between the channel irons 14 by a pin 18 and including pipes 19 by which fluid under pressure derived from a compressor in the tractor may be carried to the cylinder. On the upper ends of the upstanding arms 11 are pivotally attached tie bars 20 by pins 21.

In the use of the device, with the rock picker assembled, as in FIGURE 1, the mountings for which are not shown since this must vary for different types of tractors, rocks gathered by the teeth 2 are pushed back by the blade 22. For this, when the bar 13 is pulled down by the connecting rod 15 it moves the arms 11 back and by the tie bars 20 and blade push arms 23 the blade 22 is pushed out and upward, from which position it can clear rocks that are too big to handle, or the blade can be moved down and back by a reverse movement of the bar 13 and push the rocks back on the teeth of the fork.

Having thus particularly ascertained the nature of my said invention what I claim and wish to secure by Letters Patent is:

In a rock gathering attachment for tractors a fork for picking up rocks, said fork including a base plate and a series of teeth fixed in the base plate forwardly projecting, uprights on the fork base plate, a pair of angle brackets fixed to the uprights, said brackets including vertical portions adapted for bolting to the uprights and arms extending horizontally forward, a shaft mounted on the arms of the angle brackets free to turn axially, push arms fixed transversely to the shaft projecting above and below the shaft, a blade carried by the lower ends of said arms movable backward and forward over the fork teeth for shifting rocks on said teeth by a backward and forward movement applied to the upper ends of said arms, and hydraulic means for imparting the forward and backward movement to the upper end of the push arms, said hydraulic means including upstanding arms on the fork, tie bars connecting said upstanding arms and push arms, a hydraulic element, and means connecting the hydraulic element to the upstanding arms for moving the upstanding arms forward and backward.

References Cited in the file of this patent
UNITED STATES PATENTS 2,218,579   Jones et al.   Oct. 22, 1940
2,732,673   Henne   Jan. 31, 1956